(12) United States Patent
Kojima et al.

(10) Patent No.: US 11,967,191 B2
(45) Date of Patent: Apr. 23, 2024

(54) DEVICE, METHOD AND STORAGE MEDIUM

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 408 days.

(21) Appl. No.: 17/336,311

(22) Filed: Jun. 2, 2021

(65) Prior Publication Data
US 2021/0407231 A1 Dec. 30, 2021

(30) Foreign Application Priority Data

Jun. 25, 2020 (JP) .................................. 2020-110039

(51) Int. Cl.
*G07C 9/00* (2020.01)
*E05B 41/00* (2006.01)
*E05B 47/00* (2006.01)
*G06V 40/16* (2022.01)

(52) U.S. Cl.
CPC ......... *G07C 9/00563* (2013.01); *G06V 40/16* (2022.01); *E05B 41/00* (2013.01); *E05B 47/0001* (2013.01)

(58) Field of Classification Search
CPC ............ G07C 9/00563; G07C 9/00174; G06Q 50/265; G06Q 50/12; G06Q 20/40145; G06Q 20/3278; G06V 40/16; E05B 41/00; E05B 47/0001
See application file for complete search history.

(56) References Cited

U.S. PATENT DOCUMENTS

| 2009/0116700 | A1* | 5/2009 | Wakabayashi ..... G07C 9/00571 382/115 |
| 2010/0157062 | A1 | 6/2010 | Baba |
| 2017/0070657 | A1 | 3/2017 | Yokomizo |
| 2017/0221289 | A1* | 8/2017 | Trani ...................... H04W 4/33 |
| 2017/0330401 | A1 | 11/2017 | Lien |
| 2019/0286795 | A1 | 9/2019 | Bhatt |
| 2021/0201609 | A1* | 7/2021 | Amuduri ................ G07C 9/253 |

(Continued)

FOREIGN PATENT DOCUMENTS

CN 203812254 U * 9/2014
CN 204423477 U * 6/2015

(Continued)

OTHER PUBLICATIONS

Office Action issued for counterpart Japanese Application No. 2020-110039, issued by the Japanese Patent Office dated Jul. 5, 2022 (drafted on Jun. 29, 2022).

(Continued)

*Primary Examiner* — Dung Hong

(57) ABSTRACT

Provided is a device that includes: a monitoring camera that is arranged at an entrance where an electric lock, which can read a unique ID of each key to be used, is installed, a detection unit configured to detect an operation of the electric lock, and a control unit configured to associate the unique ID of a used key with image data captured by the monitoring camera when an operation of the electric lock has been detected.

17 Claims, 3 Drawing Sheets

(56) References Cited

U.S. PATENT DOCUMENTS

| | | | | |
|---|---|---|---|---|
| 2022/0343673 | A1* | 10/2022 | Senda | G06V 20/52 |
| 2023/0136234 | A1* | 5/2023 | Ihara | G06F 21/32 |
| | | | | 713/186 |

FOREIGN PATENT DOCUMENTS

| CN | 105741395 | A | | 7/2016 | |
|---|---|---|---|---|---|
| CN | 206646855 | U | * | 11/2017 | |
| CN | 206757745 | U | * | 12/2017 | |
| CN | 107563352 | A | | 1/2018 | |
| CN | 207216724 | U | * | 4/2018 | |
| CN | 208781310 | U | * | 4/2019 | |
| CN | 209149396 | U | * | 7/2019 | |
| CN | 209607049 | U | * | 11/2019 | |
| CN | 110718010 | A | * | 1/2020 | |
| CN | 210573993 | U | * | 5/2020 | |
| DE | 102018104152 | A1 | | 8/2019 | |
| EP | 2202698 | A1 | | 6/2010 | |
| JP | 2007206816 | A | | 8/2007 | |
| JP | 2009037573 | A | * | 2/2009 | |
| JP | 2010154134 | A | | 7/2010 | |
| JP | 2012067458 | A | * | 4/2012 | |
| JP | 2015127853 | A | * | 7/2015 | |
| JP | 2015162232 | A | | 9/2015 | |
| JP | 2019080271 | A | | 5/2019 | |
| JP | 2020017155 | A | | 1/2020 | |
| JP | 2020042374 | A | | 3/2020 | |
| KR | 20170056193 | A | * | 5/2017 | |
| KR | 2020018990 | A | * | 2/2020 | G06F 21/32 |
| WO | 2017136160 | A1 | | 8/2017 | |
| WO | 2020014311 | A1 | | 1/2020 | |

OTHER PUBLICATIONS

Office Action issued for counterpart European Application 21181046.0, issued by the European Patent Office dated Aug. 24, 2022.

Extended European Search Report for European Patent Application No. 21181046.0, issued by the European Patent Office dated Nov. 29, 2021.

Office Action issued for counterpart Indian Application No. 202114023545, issued by the India Intellectual Property Office dated Mar. 1, 2022.

Office Action issued for counterpart Chinese Application 202110465369.X, issued by The State Intellectual Property Office of People's Republic of China dated Mar. 31, 2023.

* cited by examiner

DEVICE, METHOD AND STORAGE MEDIUM

BACKGROUND

1. Technical Field

The present invention relates to a device, a method, and a storage medium.

2. Related Art

Conventionally, various security systems using a monitoring camera are proposed (for example, see Patent Literature 1).

Patent Literature 1

Japanese Patent Application Publication No. 2015-162232

SUMMARY

In a first aspect of the invention, a device is provided. The device may include a monitoring camera that is arranged at an entrance where an electric lock, which can read a unique ID of each key to be used, is installed. The device may include a detection unit that detects an operation of the electric lock. The device may include a control unit that associates the unique ID of the used key with the image data captured by the monitoring camera when the operation of the electric lock is detected.

In a second aspect of the invention, there is provided a method that is performed by a computer which includes a monitoring camera arranged at an entrance where an electric lock, which can read a unique ID of each key to be used, is installed. The method may include detecting an operation of the electric lock. The method may include controlling to associate the unique ID of the used key with the image data captured by the monitoring camera when the operation of the electric lock is detected.

In a third aspect of the invention, a storage medium with a program recorded thereon is provided. The program may cause the computer to function as a monitoring camera that is arranged at an entrance where an electric lock, which can read a unique ID of each key to be used, is installed. The program may cause the computer to function as a detection unit that detects an operation of the electric lock. The program may cause the computer to function as a control unit that associates the unique ID of a used key and image data captured by the monitoring camera when an operation of the electric lock is detected.

The summary clause of the above described invention does not necessarily describe all necessary features of the embodiments of the present invention. The present invention may also be a sub-combination of the features described above.

DESCRIPTION OF EXEMPLARY EMBODIMENTS

Hereinafter, the invention will be described through embodiments of the invention, but the following embodiments do not limit the invention according to the claims. In addition, not all of the combinations of features described in the embodiments are essential to the solving means of the invention.

Figure 1:
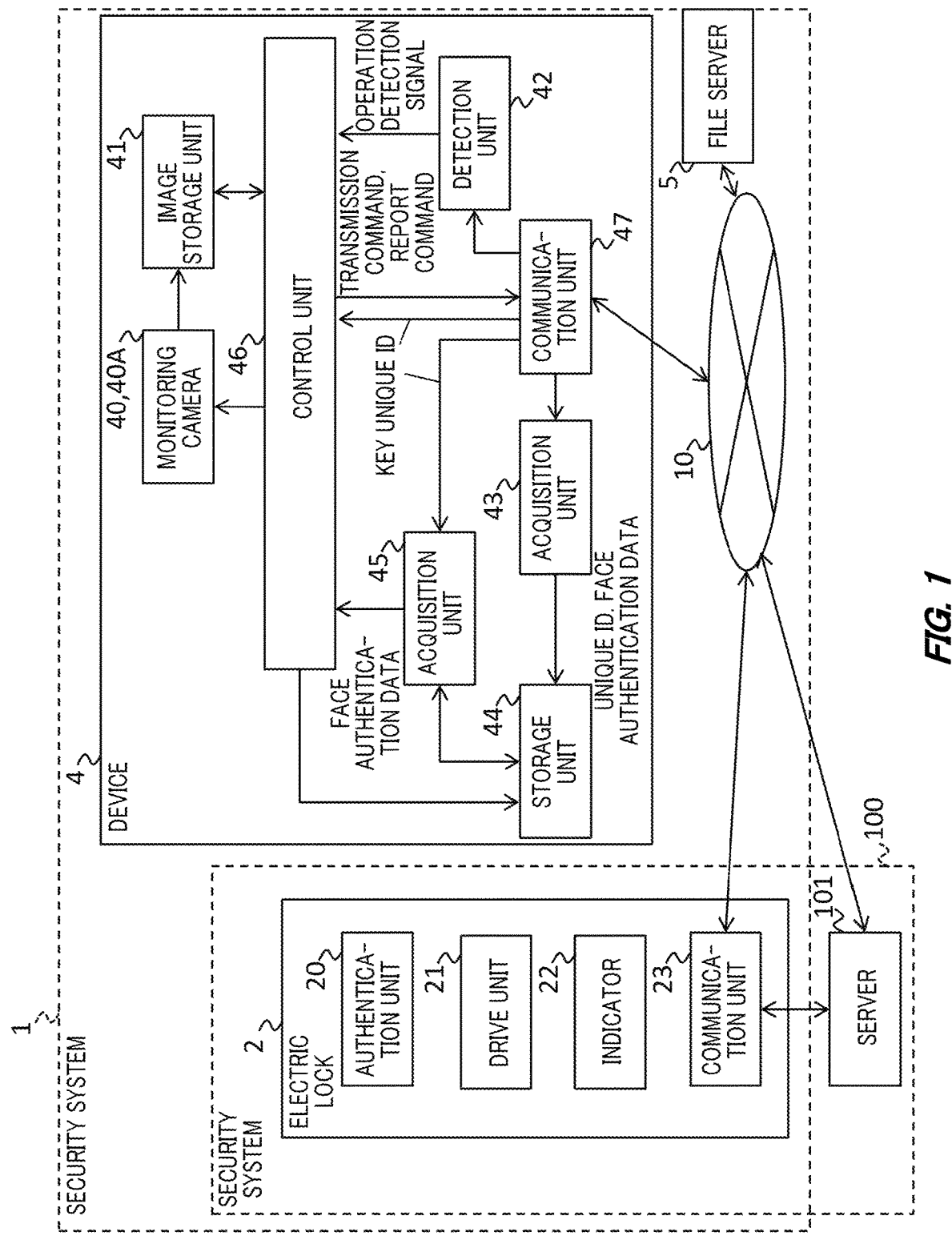
FIG. 1 illustrates a security system 1 according to this embodiment.

[1. Security system 1] FIG. 1 illustrates a security system 1 according to this embodiment. The security system 1 includes an electric lock 2, a device 4, and a file server 5.

Here, the electric lock 2, the device 4, and the file server 5 may be connected to each other via a communication network 10. In the drawing, the electric lock 2, the device 4, and the file server 5 are connected via a single communication network 10, but may be connected via a separate network.

The communication network 10 may be configured to include various networks such as the Internet, a wide area network (WAN), a local area network or a combination thereof. The communication network 10 may include a connection point through at least one of the wired or wireless. The communication network 10 may be realized by a dedicated line which is separated from a public line such as the Internet or the like.

[1.1. Electric lock 2] The electric lock 2 can read a unique ID of each key to be used, and is installed at an entrance or exit such as facilities.

The facilities may be plants, or may be schools, houses, stations, museums, hospitals, stores (restaurants as an example), and the like. Herein, in addition to an industrial plant such as a chemistry plant or a biotechnology plant, the plant may be a plant for managing and controlling a well source such as a gas field or an oil field and the surroundings thereof, a plant for managing and controlling power generation such as hydropower, thermal power, nuclear power, or the like, a plant for managing and controlling environmental power generation such as solar power, wind power, or the like, or a plant for managing and controlling water and sewage, dams, or the like. The entrance of a facility may be the entrance which is installed at a boundary between the inside and outside of the facility, or may be the entrance which is installed at the boundary between one region and another region in the facility.

The electric lock 2 may be a lock that locks and unlocks the entrance, or may be a lock to which a mechanism for electrically locking or unlocking is incorporated. The electric lock 2 may be at least possible in a locking operation and an unlocking operation at least on one side of the inside and the outside of the entrance. The electric lock 2 includes an authentication unit 20, a drive unit 21, an indicator 22, and a communication unit 23.

[1.1-1. Authentication unit 20] The authentication unit 20 performs authentication using authentication information provided in a key which is used by a person who performs locking or unlocking. The authentication unit 20 may be possible to read the unique ID of each key to be used. In addition to the authentication using the authentication information of a key, the authentication unit 20 may perform authentication using biological information of a person who performs locking or unlocking, or authentication using a password to be input through an input device. The authentication unit 20 may supply an authentication result to the drive unit 21. In a case where a legitimate authentication result is obtained, the authentication unit 20 may supply the read unique ID to the communication unit 23.

The key may be formed in a card shape. The authentication information of the key may be physically provided on the surface of the key by engraving, printing, or pasting, or may be magnetically or electrically provided on the surface or inside the key by an RF tag.

[1.1-2. Drive unit 21] The drive unit 21 performs the locking or unlocking of the lock portion of the electric lock 2. In this embodiment, as an example, the drive unit 21 may perform the locking or unlocking according to the fact that an authentication result indicating that a person who performs locking or unlocking is a legitimate person (also referred to as a legitimate authentication result) is supplied from the authentication unit 20. The drive unit 21 may alternately perform the locking or unlocking each time the legitimate authentication result is supplied, or may automatically perform the locking by a so-called automatic locking function in which the unlocking is performed each time the legitimate authentication result is supplied. Noted that the power source of the drive unit 21 may be a battery, or may be a power source which is installed in the facility.

[1.1-3. Indicator 22] The indicator 22 is provided on the surface of the electric lock 2, and may emit light to indicate the state of the electric lock 2 or the authentication result of the authentication unit 20. The indicator 22 may have at least one light lamp, and may emit colored light corresponding to the state of the electric lock 2 or the authentication result of the authentication unit 20. The state of the electric lock 2 may be at least one of the unlocked state (also referred to as an unlocked state), a locked state (also referred to as a lock state), or a transition state between the unlocked state and the locked state.

[1.1-4. Communication unit 23] The communication unit 23 communicates with the device 4 via the communication network 10. The communication unit 23 may transmit the fact that the electric lock 2 is operated and the unique ID of the key read by the authentication unit 20 to the device 4.

Note that the communication unit 23 may further communicate with a server 101 via a dedicated line. The server 101 may include a security system 100 separate from the security system 1 along with the electric lock 2, and supply a security service of the facility. For example, the server 101 may monitor the state of the electric lock 2, and dispatch a guard to the facility at an abnormal time.

[1.2. Device 4] The device 4 assists the security of the facility in cooperation with the electric lock 2 which is installed outside the device 4. The device 4 includes a monitoring camera 40, an image storage unit 41, a detection unit 42, an acquisition unit 43, a storage unit 44, an acquisition unit 45, a control unit 46, and a communication unit 47. In this embodiment, as an example, the device 4 may include the monitoring camera 40, the image storage unit 41, the detection unit 42, the acquisition unit 43, the storage unit 44, the acquisition unit 45, the control unit 46, and the communication unit 47 in a single housing (not illustrated), or may arrange them near the electric lock 2.

[1.2-1. Monitoring camera 40] The monitoring camera 40 is arranged at the entrance where the electric lock 2 is provided so as to capture an image. In this embodiment, as an example, the monitoring camera 40 is able to capture the image of a passer (an incoming person moving inward from the entrance and an outgoing person moving outward from the entrance) passing the entrance, but instead or in addition thereto, may also be able to capture the image of an operator of the electric lock 2. The passer who passes the entrance may be a person (an employee of a store as an example) who performs the locking or unlocking using the key owned by the passer, or may be a person (an associated trader of a store as an example) who is allowed to perform the locking or unlocking using the key owned by another person.

The captured region of the monitoring camera 40 may include the entrance installed with the electric lock 2, or not. The captured region may be the inside of the facility, or may be the outside.

The monitoring camera 40 may perform the capturing each time an instruction signal of capturing is received from the control unit 46. The monitoring camera 40 may perform the capturing at a time to generate still image data, or may perform the capturing within a reference time width to generate moving image data. In a case where the monitoring camera 40 captures the moving image data, the capturing may be performed at 30 f/s as an example The monitoring camera 40 may be a visible light camera, or may be an infrared or ultraviolet (X-ray as an example) camera. The monitoring camera 40 may store the captured image data in the image storage unit 41.

[1.2-2. Image storage unit 41] The image storage unit 41 stores the image data acquired by the monitoring camera 3. The image storage unit 41 may store the image data captured by the monitoring camera 3 in association with the capturing date and time. The image storage unit 41 may store the image data only for at least a reference period (5 days as an example), or may store by sequentially overwriting with new image data. The capacity of the image storage unit 41 may be 1 TB as an example.

[1.2-3. Detection unit 42] The detection unit 42 detects an operation of the electric lock 2. The detection unit 42 may detect the operation of the electric lock 2 by communication between the electric lock 2 and the communication unit 47. The detection unit 42 may supply a signal indicating the detection result to the control unit 46.

[1.2-4. Acquisition unit 43] The acquisition unit 43 is an example of a second acquisition unit, and acquires corresponding data between the unique ID of each key and the face authentication data of a key user from the security system 100. The acquisition unit 43 may acquire the corresponding data from the server 101 of the security system 100 via the communication unit 47, or may supply the acquired corresponding data to the storage unit 44. The acquisition unit 43 may acquire the corresponding data between the unique ID and the face authentication data and supply it to the storage unit 44 periodically or in response to the transmission from the server 101.

The face authentication data may be data for authenticating the key user, or may be data indicating the face of a legitimate key owner. The face authentication data may be the image data of a face, or may be data indicating the features of a face. The features of a face may be a positional relationship of the feature points of face, may be colors of eyes, skin, and hairs, or may be the color or shape or the like of accessories (glasses, piercings, or the like as an example). The face authentication data may be the same data as the data for the authentication in a case where the authentication unit 20 of the electric lock 2 performs face authentication.

[1.2-5. Storage unit 44] The storage unit 44 is an example of a first storage unit, and stores the face authentication data in association with the unique ID of each key. The storage unit 44 may store the data acquired by the acquisition unit 43.

[1.2-6. Acquisition unit 45] The acquisition unit 45 is an example of a first acquisition unit, and acquires the face authentication data associated in advance with the unique ID of the key read to the electric lock 2. The acquisition unit 45 may acquire the unique ID, which is read to the electric lock 2, via the communication unit 47. The acquisition unit 45 may acquire the face authentication data corresponding to the unique ID from the storage unit 44. The acquisition unit 45 may supply the acquired face authentication data to the control unit 46 in association with the unique ID of the key.

[1.2-7. Control unit 46] The control unit 46 is configured to associate the unique ID of the used key with the image data captured by the monitoring camera 40 when the operation of the electric lock 2 has been detected. The control unit 46 may control the monitoring camera 40, or may cause the monitoring camera 40 to perform the capturing of the image data (also referred to as the image data at operation) associated with the unique ID when the operation of the electric lock 2 has been detected by the detection unit 42. The control unit 46 may acquire the unique ID of the key read to the electric lock 2 via the communication unit 47 to be associated with the unique ID with the image data at operation. The control unit 46 may cause the image storage unit 41 to store the image data at operation and the unique ID of the key in association with each other.

The control unit 46 may be an example of a first determination unit, and may determine the distinction between the face (the face of the passer at the entrance as an example in this embodiment) in the image data at operation to which the unique ID is associated and the face indicated by the face authentication data corresponding to the unique ID. For example, the control unit 46 may detect the face in the image data at operation stored in the image storage unit 41 in association with the unique ID, and determine the distinction from the face indicated by the face recognition data supplied from the acquisition unit 45 in association with the same unique ID. The control unit 46 may determine the distinction between the faces using the conventionally known face recognition technology.

The control unit 46 may control the communication unit 47 according to the determination result to transmit various data. The control unit 46 may further control each part of the device 4. As an example, the control unit 46 may change the stored content of the storage unit 44 according to the determination result.

[1.2-8. Communication unit 47] The communication unit 47 may communicate with the electric lock 2. The communication unit 47 may receive the unique ID of the key used at the time of locking or unlocking from the electric lock 2 to supply it to the control unit 46.

The communication unit 47 may transmit various data by the control from the control unit 46. For example, the communication unit 47 may be an example of a first transmission unit, and may transmit the image data at operation to a preset transmission destination if it is determined that the face in the image data at operation in the control unit 46 is different from the face indicated by the face authentication data.

The transmission destination may be, for example, the server 101 that constitutes another security system 100 different from the electric lock 2, a security company with the electric lock 2 installed therein, an owner or a management company of the facility, a police station or a fire station of the region that includes the facility, or an emergency hospital.

The communication unit 47 may be an example of a second transmission unit, and transmit the image data (the image data at operation as an example in this embodiment) captured by the monitoring camera 40 to the file server 5 which can be accessible from other devices. The communication unit 47 may transmit the image data at operation to the file server 5 every time the image data at operation is captured according to the control from the control unit 46, or may periodically transmit the image data at operation, which has been captured and accumulated, to the file server 5.

The communication unit 47 may be an example of a third transmission unit, and may transmit the image data (the image data at operation as an example in this embodiment) captured by the monitoring camera 40 or the position information of the image data to the security system 100 when the detection unit 42 has detected the operation of the electric lock 2. The position information of the image data may be an address of the image data in the image storage unit 41 or the file server 5, or may be a capturing time of the image data.

[1.3. File server 5] The file server 5 is accessible from another device (as an example, the server 101 connected to the electric lock 2 and a security company where the electric lock 2 is installed) different from the device 4, and shares files to be stored with the other device. The file server 5 may be accessible from a plurality of devices at the same time.

[1.4. Effects obtained from security system 1] According to the device 4 in the security system 1 described above, the unique ID of the used key and the image data captured by the monitoring camera 40 are associated when the operation of the electric lock 2 has been detected, so that the owner of the used key and the passer passing through the entrance can be referred.

The operation of the electric lock 2 is detected through communication with the electric lock 2, so that the operation can be accurately detected.

The distinction between the face in the image data at operation associated with the unique ID of the used key and the face indicated by the face authentication data is determined, so that it is possible to determine whether the passer of the entrance is a legitimate user of the key.

The face authentication data is acquired from the storage unit 44 and used for determination, so that the determination can be performed early compared to a case where the face authentication data is acquired from the outside every time the determination is made.

The corresponding data between the unique ID of the key and the face authentication data is acquired from the security system 100 and stored in the storage unit 44 in advance, so that the correspondence relationship between the unique ID and the face authentication data can be determined in line with the security system 100.

The image data is transmitted to the preset transmission destination when it is determined that the face in the image data at operation is different from the face indicated by the face authentication data. Therefore, it is possible to confirm the image data at operation early.

The image data captured by the monitoring camera 40 is transmitted to the file server 5, so that the accessibility to the image data can be increased while preventing the concentration of access to the device 4.

Figure 2:
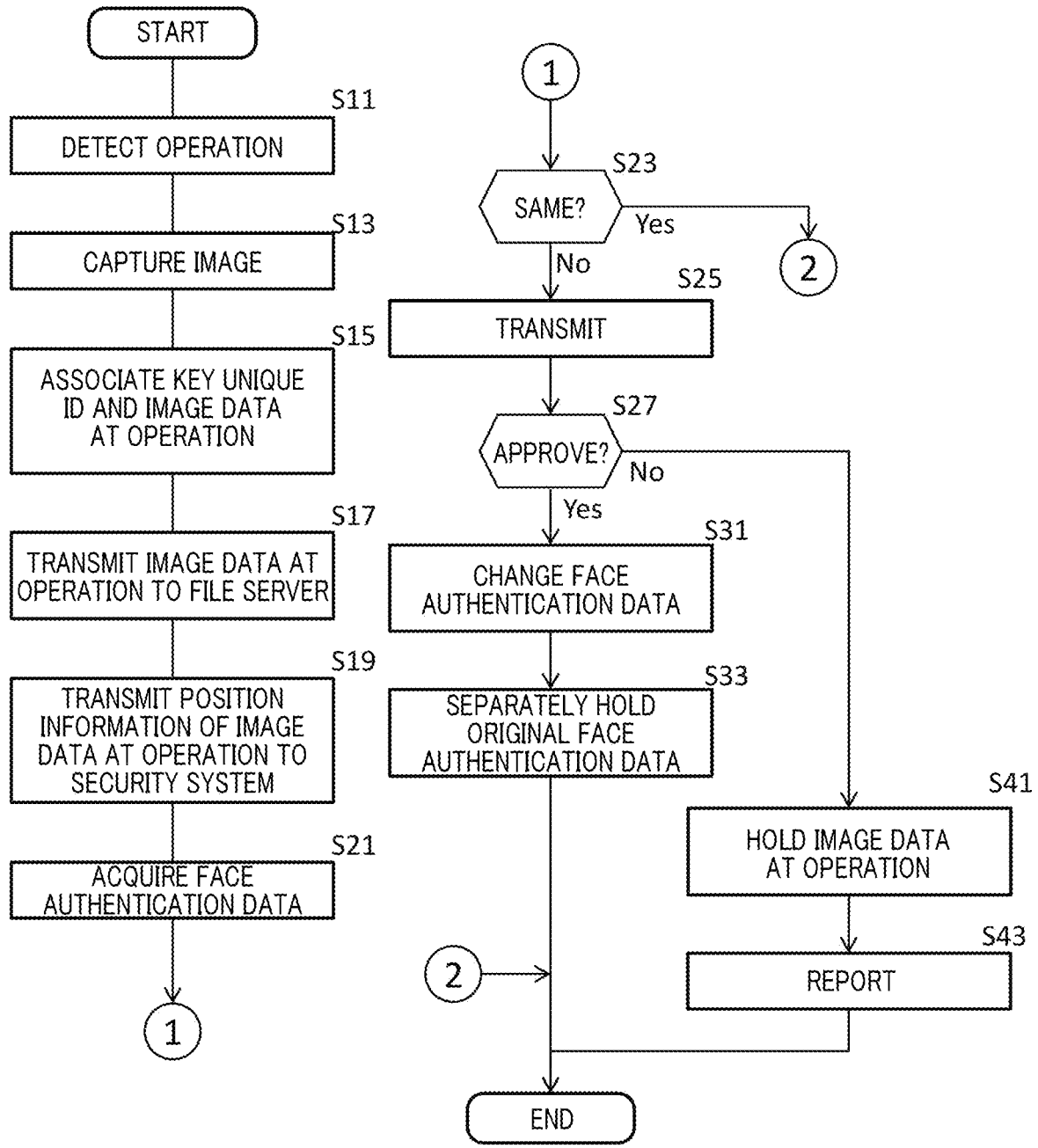
FIG. 2 illustrates an operation of a device 4.

[2. Operation of device 4] FIG. 2 illustrates the operation of the device 4. The device 4 assists the security of the facility by performing the processes of Steps S11 to S43.

In Step S11, the detection unit 42 detects the operation of the electric lock 2. The detection unit 42 may detect the operation (any of the locking and unlocking as an example in this embodiment) of the electric lock 2 through the communication between the electric lock 2 and the communication unit 47.

In Step S13, the control unit 46 causes the monitoring camera 40 to capture the image data at operation.

In Step S15, the control unit 46 acquires the unique ID of the key used in the locking or unlocking from the communication unit 47 and associates the unique ID with the image data at operation. The control unit 46 may cause the image storage unit 41 to store the unique ID of the key and the image data at operation in association with each other.

In Step S17, the control unit 46 transmits the image data at operation from the communication unit 47 to the file server 5. The control unit 46 may transmit the unique ID of the key associated with the image data at operation along with the capturing date and time of the image data at operation to the file server 5.

In Step S19, the control unit 46 transmits the image data at operation or the position information of the image data at operation from the communication unit 47 to the security system 100. In this embodiment, as an example, the control unit 46 transmits the address of the image data at operation in the file server 5 to the security system 100.

In Step S21, the acquisition unit 45 acquires the face authentication data which is associated in advance with the unique ID of the key used for locking or unlocking in the storage unit 44.

In Step S23, the control unit 46 determines the distinction between the face in the image data at operation associated with the unique ID of the key used for locking or unlocking and the face indicated by the face authentication data corresponding to the unique ID. In a case where the both faces are determined to be the same (Step S23; Yes), the operation of the device 4 ends. In a case where it is determined that the both faces are different (Step S23; No), the process proceeds to Step S25.

In Step S25, the control unit 46 transmits the image data at operation from the communication unit 47 to the preset transmission destination. In this exemplary operation, the transmission destination may be the owner or management company of the facility as an example In Step S27, the control unit 46 determines whether approval for the face in the image data at operation is received from the transmission destination in Step S25. The approval may be approval indicating that the face in the image data at operation is set as a legitimate user of the key. In a case where the approval is not received, the person of the face in the image data at operation may be a person (an associated trader of a store as an example) who should ask another person for locking or unlocking with the owned key of that person.

In a case where it is determined in the process of Step S27 that the approval is not received (Step S27; No), the process proceeds to Step S41. In a case where it is determined that the approval is received (Step S27; Yes), the process proceeds to Step S31.

In Step S31, the control unit 46 functions as an example of a change unit, and changes the face authentication data stored in the storage unit 44 in association with the unique ID of the key used for locking or unlocking. The control unit 46 may create the face authentication data for authenticating the face in the image data at operation to set the data as new face authentication data, and store the new data in the storage unit 44 in association with the unique ID of the key. As an example, the control unit 46 may set the image data at operation as the face authentication data, or may extract a face portion in the image data at operation as the face authentication data, or may detect feature points of the face to generate the face authentication data.

In Step S33, the control unit 46 separately stores the face authentication data before change in the storage unit 44. The control unit 46 may store the face authentication data associated with the unique ID of the key used for locking or unlocking as the past face authentication data. After the process of Step S33, the operation of the device 4 ends.

In Step S41, the control unit 46 stores the image data at operation, which has not been approved, in the image storage unit 41 as an unapproved image data at operation. Thereby, the image storage unit 41 functions as an example of a third storage unit, and further stores the image data at operation, which is determined as indicating the face different from the face authentication data among the image data at operation associated with the unique ID of the key in Step S15, as an unapproved image data at operation. The image storage unit 41 may store the unapproved image data at operation in association with the capturing date and time.

In Step S43, the control unit 46 causes the communication unit 47 to function as an example of a first report unit, and makes a report to the security system 100 based on the storage history of the unapproved image data at operation of the same face among the unapproved image data at operation stored by the image storage unit 41. For example, the control unit 46 may extract the unapproved image data at operation indicating the same face as the face in the unapproved image data at operation stored in Step S41 in the image storage unit 41, and make a report based on the storage history of the unapproved image data at operation which has been extracted. For example, the control unit 46 may make a report when a storage interval of the unapproved image data at operation is longer than a reference interval (for example, 1 year), may make a report when the storage interval is shorter than the reference interval (for example, 1 day), or may make a report when the number of times of storage is less than a reference number of times (for example, 3 times). After the process of Step S43, the operation of the device 4 ends.

According to the above operation, the face authentication data stored in association with the unique ID is changed when the approval for the face in the image data at operation is received from the transmission destination. Therefore, in a case where a person different from the face authentication data uses the key due to a change in the key user or the like, the face authentication data can be changed later so that the person becomes a legitimate user.

In a case where the face authentication data associated with the unique ID is changed, the face authentication data before change is separately stored, so that the past face authentication data can be left. Therefore, the face of a person, who passes through the entrance after not being a legitimate user of the key, can be detected from the past face authentication data.

When it is determined that the face indicated by the face authentication data and the face in the image data at operation are different, and further determined that the approval to set the face in the image data at operation as a legitimate user of the key is not received, the image data at operation is stored as the unapproved image data at operation. Therefore, the face of the passer different from the legitimate key user can be detected from the unapproved image data at operation which is stored in the past.

The unapproved image data at operation is stored in association with the capturing date and time, and a report is made to the security system 100 based on the storage history of the unapproved image data at operation of the same face, so that it is possible to make a report to the security system 100 based on the passing history of a person who is not a legitimate user of the key.

[3. Modification (1)] Note that in the above embodiment, the description has been given about that the image data at operation is transmitted to a preset transmission destination (the owner or management company of the facility as an example) in a case where the face in the image data at operation associated with the unique ID of the key used for locking or unlocking is different from the face indicated in the face authentication data corresponding to the unique ID, but it may not necessarily be transmitted.

In this case, the device 4 may further include a history storage unit (not illustrated) which stores a history of entry and exit through the entrance where the electric lock 2 is provided. The history storage unit is a history of entry and exit using the key (for example, master key) associated with the transmission destination of the image data at operation, and may store a history of entry and exit of a specific person (the owner of the facility as an example in this embodiment) whose face is indicated in the face authentication data associated with the unique ID of the key.

The history of entry and exit may indicate the time when the entry toward the inside from the entrance and the exit toward the outside occur. In this embodiment, as an example, in a case where the electric lock 2 is unlocked on the outside of the entrance, the unlocking time is used as an entry time, and stored in the history storage unit. In a case where the locking occurs on the inside of the entrance, the unlocking time is used as an exit time, and stored in the history storage unit. However, the method of determining the entry and exit is not limited to this. For example, the device 4 is provided with a monitoring camera for capturing the face of the outgoing person, a monitoring camera for capturing the face of the incoming person, and a determination unit (not illustrated) for determining whether any of the entry and exit occur from the captured image of these monitoring cameras, and may determine the entry and exit by the determination of the determination unit.

The control unit 46 may be an example of a transmission control unit, and may disable the function of the communication unit 47 that transmits the image data at operation to the preset transmission destination in a case where the history of entry and exit shows that the above specific person (the owner of the facility in this embodiment) is on the inside from the entrance.

According to this modification, it is possible to prevent to unnecessarily transmit the image data at operation in a case where a person having an approval authority to enter and exit through the entrance actually sees the incoming person on the inside of the entrance.

[4. Modification (2)] In the above embodiment and modification (1), the description has been given about that a report is made to the security system 100 based on the storage history of the unapproved image data at operation of the same face, but the report may be made under other conditions. For example, the control unit 46 may make a report when a person who is not supposed to be found on the inside from the entrance has been detected on the inside.

In this case, the device 4 may further include a history storage unit (not illustrated) for storing the history of entry and exit through the entrance provided with the electric lock 2 and at least one other monitoring camera 40A arranged on the inside from the entrance provided with the electric lock 2.

The history storage unit may store the history of entry and exit performed by each person who has the face indicated by the face authentication data associated with the unique ID of each key.

The other monitoring camera 40A may be a camera different from the monitoring camera 40. The captured region of the monitoring camera 40A may include the entrance provided with the electric lock 2, or may not include it. As an example, the captured region may be the indoor located on the inside from the entrance.

The control unit 46 may be an example of a specification unit, and may specify a key on the inside from the entrance from the history of entry and exit in which each key is used. The control unit 46 may be an example of a second determination unit, and may determine the distinction between the face in the image data captured by the other monitoring camera 40A and the face indicated by the face authentication data associated with the unique ID of the key which has been specified as on the inside from the entrance. In a case where there is a plurality of faces in the image data captured by the monitoring camera 40A, the control unit 46 may determine the distinction between each of these faces and the face indicated by the face authentication data associated with the unique ID of each key.

The control unit 46 may make a report from the communication unit 47 to the security system 100 when the face in the image data captured by the other monitoring camera 40A is determined to be different from the face indicated by the face authentication data. The control unit 46 may make a report when it has been determined that at least one face in the image data is different from the face indicated by any face authentication data.

According to the modification, it is possible to make a report to the security system 100 in a case where a person who has no history of entry and exit is captured on the inside of the entrance.

[5. Other modifications] Note that in the above embodiment and modifications (1) and (2), the description has been given about that the device 4 includes the acquisition unit 43, but the device may do not include the acquisition unit 43. In this case, the storage unit 44 may store the face authentication data in association with the unique ID of each key in advance.

The description has been given about that the device 4 includes the acquisition unit 45, but the acquisition unit 45 may be not included. In this case, the device 4 may not determine the distinction between the face in the image data at operation and the face of the face authentication data as long as the image data at operation and the unique ID are associated.

The description has been given about that the device 4 includes the communication unit 47, but the communication unit 47 may be not included. In this case, the image data (the image data at operation as an example) which is captured by the monitoring camera 40 and stored in the device 4 may be accessible from an external device.

The description has been given about that the device 4 includes the storage unit 44, but the storage unit 44 may be not included. In this case, the acquisition unit 45 may acquire the face authentication data corresponding to the unique ID of the key from the outside of the device 4 without acquiring it from the storage unit 44 of the device 4. For example, the server 101 may store the face authentication data of the key user in association with the unique ID of each key, and the communication unit 47 may communicate with the server 101. Then, the acquisition unit 45 may acquire the face authentication data corresponding to the unique ID from the server 101 which has acquired the unique ID read to the electric lock 2. The unique ID may be supplied from the electric lock 2 to the server 101, or may be supplied from the device 4 (the acquisition unit 45 of the device 4 as an example) to the server 101. In this way, the device 4 can be compact and simplified compared to a case where the face authentication data is acquired from the storage unit 44 of the device 4.

The description has been given about that the storage unit 44 stores one piece of the face authentication data in association with the unique ID of each key. However, a plurality of pieces of the face authentication data may be stored. For example, the storage unit 44 may accumulate and store the face authentication data generated from the image data captured when one key is used in association with the unique ID of the one key. In this case, the control unit 46 may generate, accumulate, and store the face authentication data for authenticating the face included in the image data at operation every time the image data at operation is generated when one key is used. The control unit 46 may use a model learned by one or more pieces of the face authentication data corresponding to the unique ID, and may determine the distinction between the face indicated by the one or more pieces of the face authentication data and the face in the image data at operation associated with the unique ID. In this case, commonly, it is possible to detect the use of the key by different person. The model to be used by the control unit 46 may be an image analysis engine, or may be learned by machine learning such as deep learning. The model may be provided in the device 4 separately from the control unit 46, and may be stored in the storage unit 44 as an example The description has been given about that the monitoring camera 40 captures an image every time an instruction signal for capturing is received from the control unit 46 (as an example, every time the operation of the electric lock 2 is detected), but the capturing may be performed at all times. In this case, the control unit 46 may associate the unique ID of the used key and the image data captured within the reference period (30 seconds as an example) including operation timing when detecting the operation of the electric lock 2.

The description has been given about that the face authentication data is changed when the approval for the face in the image data at operation is received, but the change of the face authentication data may be not performed immediately. For example, the control unit 46 may change the face authentication data when the approval is received and a reference transition period (1 month as an example) is elapsed, or may change the face authentication data when the approval has been received for a reference number of times (10 times as an example).

The description has been given about that the image data at operation is transmitted to a preset transmission destination in a case where it is determined that the face indicated by the face authentication data and the face in the image data at operation are different, but other processes may be performed. For example, the control unit 46 may forcibly perform locking at least one of the electric lock 2 or one or more other electric locks (not illustrated) installed in the same facility, or may maintain at least one electric lock in the locked state in a case where it is determined that the face indicated by the face authentication data and the face in the image data at operation are different. In this way, it is possible to restrict a suspicious person from moving in the facility.

The description has been given about that the image data at operation is stored as the unapproved image data at operation when it is determined in Step S23 that the face indicated by the face authentication data and the face in the image data at operation are different, and it is determined in Step S27 that the approval to set the face in the image data at operation as a legitimate user of the key is not received, but the unapproved image data at operation may be stored under other conditions. For example, the control unit 46 may store the image data at operation to the image storage unit 41 when it is determined in Step S23 that the face indicated by the face authentication data and the face in the image data at operation are different. As an example, the control unit 46 may store the image data at operation as the image data at operation of the face different from the face authentication data. Also in this case, the face of the passer different from the legitimate key user can be detected from the image data at operation stored in the past.

The description has been given about that the control unit 46 makes a report from the communication unit 47 to the security system 100 based on the storage history of the unapproved image data at operation of the same face or the like, but the report may be made under other conditions. For example, the control unit 46 may make a report when the face in the image data at operation is not possible to be recognized In this case, the electric lock 2 may require the unlocking operation when moving from the inside of the entrance to the outside, or the monitoring camera 40 may be arranged on the outside of the entrance. Instead or in addition, the electric lock 2 may require the unlocking operation when moving from the outside to the inside of the entrance, or the monitoring camera 40 may be arranged on the inside of the entrance. In this way, it is possible to capture the image of the passer from the side in an advancing direction, that is, a front side (as an example, a person who performed the locking or unlocking using the owned key, or a person who asked another person to perform the locking or unlocking using the owned key) when the locking or unlocking operation of the electric lock 2 is performed. Therefore, it is possible to make a report to the security system 100 in a case when there is a suspicious passer acting such that the face is not captured.

The control unit 46 may make a report when a person is not reflected in the image data at operation. In this case, it is possible to make a report to the security system 100 in a case where suspicious locking or unlocking is performed.

The description has been given about that the device 4 includes the monitoring camera 40, the image storage unit 41, the detection unit 42, the acquisition unit 43, the storage unit 44, the acquisition unit 45, the control unit 46, and the communication unit 47 in a single housing, but these configurations may be divided in a plurality of housings. For example, the device 4 may include at least the monitoring camera 40 and the image storage unit 41 in a first housing, and may include the remaining configurations in a second housing. In this case, the second housing may be arranged elsewhere such as the outside of the facility as long as the first housing is arranged near the electric lock 2.

Various embodiments of the invention may be described with reference to a flowchart and a block diagram. Here, the block may be (1) a step of the process in which the operation is performed, or (2) a section of a device which serves to execute the operation. The specific step and section may be mounted in a dedicated circuit, which is supplied together with a computer-readable instruction stored on a computer-readable medium, and/or a processor which is supplied together with a computer-readable instruction stored on the computer-readable medium. The dedicated circuit may include a digital and/or analog hardware circuit, or may include an integrated circuit (IC) and/or a discrete circuit. The programmable circuit may include a reconstructive hardware circuit including a logical AND, a logical OR, a logical XOR, a logical NAND, a logical NOR, memory elements such as other logical operations, flip-flops, registers, field programmable gate arrays (FPGAs), programmable logic arrays (PLAs), and the like.

The computer readable medium may include any tangible device that can store instructions executed by the appropriate device, and as a result, the computer-readable medium having instructions stored in the device comprises a product including an instruction that can be executed to create a means for performing the operation designated in a flowchart or block diagram. Examples of the computer-readable medium may include electronic storage medium, magnetic storage medium, optical storage medium, electromagnetic storage medium, semiconductor storage medium, and the like. More specific examples of the computer-readable medium may include floppy (registered trademark) disks, diskettes, hard disks, random access memories (RAM), read-only memories (ROM), erasable programmable read-only memories (EPROM or flash memory), electrically erasable programmable read-only memories (EEPROM), static random access memories (SRAM), compact disk read-only memories (CD-ROM), digital versatile disks (DVD), Blu-ray (registered trademark) disks, memory sticks, integrated circuit cards, and the like.

The computer-readable instructions may include either source code or object code written in any combination of one or more programming languages, including assembler instructions, instruction set architecture (ISA) instructions, machine instructions, machine-dependent instructions, microcode, firmware instructions, state setting data, or object-oriented programming languages such as Smalltalk, JAVA (registered trademark), C++, etc., and traditional procedural programming languages such as "C" programming languages or similar programming languages.

The computer-readable instructions are provided locally or over a wide area network (WAN) such as a local area network (LAN), the Internet, etc., for processors or programmable circuits of general purpose computers, special purpose computers, or other programmable data processors. A computer-readable instruction may be executed to create a means for performing an operation specified in a flowchart or block diagram. Examples of processors include computer processors, processing units, microprocessors, digital signal processors, controllers, microcontrollers, and the like.

Figure 3:
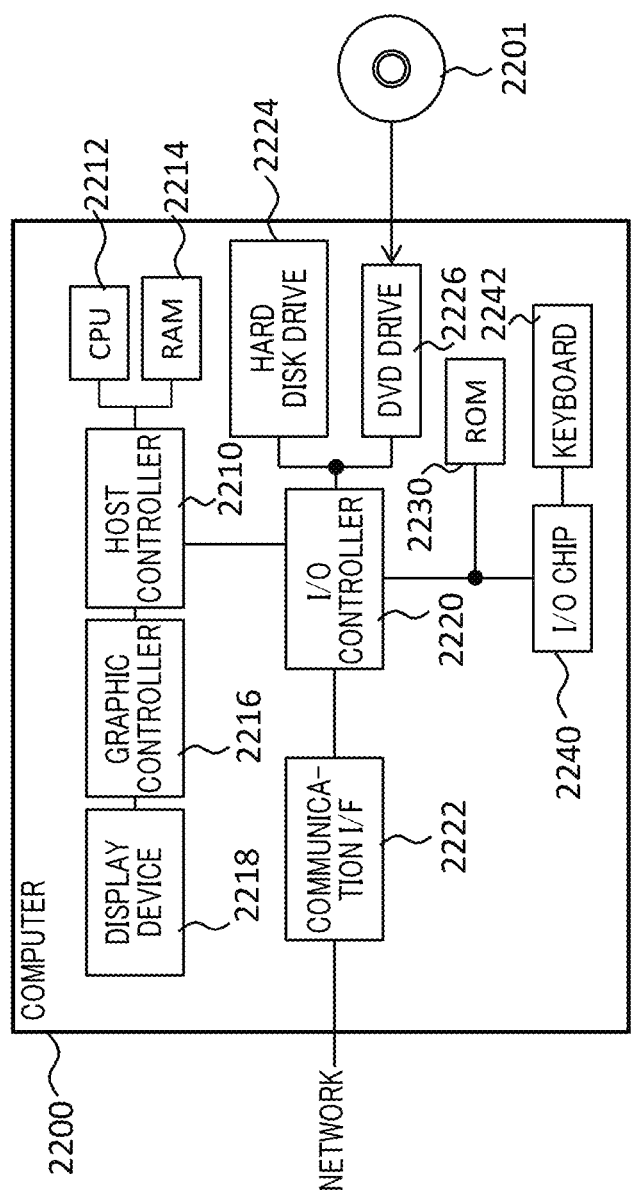
FIG. 3 illustrates an example of a computer 2200 in which a plurality of aspects of the invention may be embodied in whole or in part.

FIG. 3 illustrates an example of a computer 2200 in which a plurality of aspects of the invention may be embodied in whole or in part. A program installed on the computer 2200 can cause the computer 2200 to perform operations associated with the device according to the embodiments of the invention or to function as one or more sections of the device, or may cause the computer 2200 to perform the operations or the one or more sections, and/or may cause the computer 2200 to perform the process according to the embodiments of the invention or the steps of the process. Such a program may be executed by a CPU 2212 to have the computer 2200 perform a specific operation associated with some or all of the flowchart and the blocks of the block diagram described in this specification.

The computer 2200 according to this embodiment includes the CPU 2212, a RAM 2214, a graphic controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to a program stored in the ROM 2230 and RAM 2214, thereby controlling each unit. The graphic controller 2216 acquires image data generated by the CPU 2212 in a frame buffer or the like provided in the RAM 2214 or itself, so that the image data is displayed on the display device 2218.

The communication interface 2222 communicates with other electronic devices over a network. The hard disk drive 2224 stores programs and data used by the CPU 2212 in the computer 2200. The DVD-ROM drive 2226 reads the program or data from a DVD-ROM 2201 and provides the program or data to the hard disk drive 2224 via the RAM 2214. The IC card drive reads the program and data from the IC card and/or writes the program and data to the IC card.

The ROM 2230 stores in it a boot program or the like executed by the computer 2200 when activated, and/or a program that depends on the hardware of the computer 2200. The input/output chip 2240 may also connect various input/output units to the input/output controller 2220 via a parallel port, serial port, keyboard port, mouse port, or the like.

The program is provided by a computer-readable medium such as the DVD-ROM 2201 or IC card. The program is read from a computer-readable medium, installed on the hard disk drive 2224, the RAM 2214, or the ROM 2230, which are an example of the computer-readable medium, and executed by the CPU 2212. The information processing described in these programs is read on the computer 2200, resulting in cooperation between the program and the various types of hardware resources described above. The device or method may be configured by realizing the operation or processing of information according to the use of the computer 2200.

For example, when communication is performed between the computer 2200 and an external device, the CPU 2212 executes a communication program loaded into the RAM 2214 and may order the communication interface 2222 to perform communication processing based on the processing described in the communication program. Under the control of the CPU 2212, the communication interface 2222 reads the transmission data stored in the transmission buffer processing area provided within the recording medium such as the RAM 2214, hard disk drive 2224, DVD-ROM 2201, or IC card, transmits the read transmission data to the network, or writes reception data received from the network to a reception buffer processing area which is provided on the recording medium.

Further, the CPU 2212 may set all or necessary portions of files or database stored in an external recording medium such as the hard disk drive 2224, the DVD-ROM drive 2226 (DVD-ROM 2201), an IC card, or the like on the RAM 2214 readable, and may perform various types of processing on the data on the RAM 2214. The CPU 2212 then writes back the processed data to the external recording medium.

Various types of information, such as various types of programs, data, tables, and databases, may be stored in the recording medium and processed. The CPU 2212 may perform various types of processing on data read from the RAM 2214 including various types of operations, information processing, conditional determination, conditional branching, unconditional branching, information search/replacement, etc., which are described throughout the present disclosure and designated by an instruction sequence of the program, and the results may be written back to the RAM 2214. Further, the CPU 2212 may search for information in a file, database, or the like in the recording medium. For example, in a case where a plurality of entries with attribute values for a first attribute respectively associated with an attribute value of a second attribute are stored in the recording medium, the CPU 2212 searches an entry that is matched with the condition among the plurality of entries, where the attribute value of the first attribute is specified, reads the attribute value of the second attribute stored in the entry, thereby the attribute value of the second attribute associated with the first attribute that satisfies the preset condition may be obtained.

The program or software module described above may be stored on the computer 2200 or in a computer-readable medium near the computer 2200. Further, a recording medium such as a hard disk or RAM provided in a dedicated communication network or a server system connected to the Internet can be used as a computer-readable medium, thereby providing a program to the computer 2200 via a network.

While the present invention has been described using the embodiments, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: security system; 2: electric lock; 3: monitoring camera; 4: device; 5: file server; 10: communication network; 20: authentication unit; 21: drive unit; 22: indicator; 23: communication unit; 40: monitoring camera; 41: image storage unit; 42: detection unit; 43: acquisition unit; 44: storage unit; 45: acquisition unit; 46: control unit; 47: communication unit; 100: security system; 101: server; 2200: computer; 2201: DVD-ROM; 2210: host controller; 2212: CPU; 2214: RAM; 2216: graphic controller; 2218: display device; 2220: input/output controller; 2222: communication interface; 2224: hard disk drive; 2226: DVD-ROM drive; 2230: ROM 2240: input/output chip; 2242: keyboard

What is claimed is:

1. A device, comprising:
a monitoring camera that is arranged at an entrance where an electric lock, which can read a unique ID of each key to be used, is installed;
a detection unit configured to detect an operation of the electric lock;
a control unit configured to associate the unique ID of a used key with image data captured by the monitoring camera when an operation of the electric lock has been detected;
a first acquisition unit configured to acquire face authentication data which is in advance associated with the unique ID read to the electric lock;
a first determination unit configured to determine a distinction between a face in image data associated with the unique ID by the control unit and a face indicated by the face authentication data associated with the unique ID; and
a first transmission unit configured to transmit the image data to a preset transmission destination when the first determination unit has determined that a face in the image data associated with the unique ID by the control unit is different from a face indicated by the face authentication data.

2. The device according to claim 1, further comprising:
a communication unit configured to communicate with the electric lock to supply the unique ID of a used key to the control unit, wherein
the detection unit is configured to detect an operation of the electric lock by communication between the electric lock and the communication unit.

3. The device according to claim 1, further comprising:
a first storage unit configured to store the face authentication data of a key user in association with the unique ID of each key, wherein
the first acquisition unit is configured to acquire the face authentication data from the first storage unit.

4. The device according to claim 3, further comprising:
a second acquisition unit configured to acquire corresponding data between the unique ID and the face authentication data from a security system corresponding to the electric lock, wherein
the first storage unit is configured to store data acquired by the second acquisition unit.

5. The device according to claim 3, wherein
the first storage unit is configured to accumulate and store the face authentication data generated from image data captured when one key is used in association with the unique ID of the one key; and
the first determination unit is configured to use a model learned by the face authentication data corresponding to the unique ID, and determine a distinction between a face indicated by the face authentication data and a face in the image data associated with the unique ID by the control unit.

6. The device according to claim 1, further comprising:
a communication unit configured to communicate with a server to store the face authentication data of a key user in association with the unique ID of each key, wherein
the first acquisition unit is configured to acquire the face authentication data corresponding to the unique ID from the server which has acquired the unique ID read to the electric lock.

7. The device according to claim 1, further comprising:
a first storage unit configured to store the face authentication data of a key user in association with the unique ID of each key, wherein
the first acquisition unit is configured to acquire the face authentication data from the first storage unit; and
the device includes
a change unit configured to change the face authentication data stored in the first storage unit in association with the unique ID when an approval for a face in the image data associated with the unique ID by the control unit is received from the transmission destination.

8. The device according to claim 7, wherein, in a case where the face authentication data stored in association with the unique ID is changed, the change unit is configured to separately store the face authentication data before change in the first storage unit.

9. The device according to claim 1, further comprising:
a second storage unit configured to use a key associated with the transmission destination, and store a history of entry and exit which is performed by a specific person having a face indicated by the face authentication data associated with the unique ID of a key; and a transmission control unit configured to disable the first transmission unit in a case where the history of entry and exit indicates that the specific person is inside the entrance.

10. The device according to claim 1, wherein the electric lock requires an unlocking operation when moving from one of an inside or an outside of the entrance to the other side: and the monitoring camera is arranged on the other side of the entrance, and includes a second report unit configured to make a report to a security system corresponding to the electric lock when the first determination unit is not able to recognize a face in the image data associated with the unique ID by the control unit.

11. The device according to claim 1, further comprising a fourth report unit configured to make a report to a security system corresponding to the electric lock when a person is not reflected in the image data associated with the unique ID by the control unit.

12. The device according to claim 1, further comprising a second transmission unit configured to transmit image data captured by the monitoring camera to a file server which is accessible from other devices.

13. The device according to claim 1, further comprising a third transmission unit configured to transmit image data captured by the monitoring camera or position information of the image data to a security system corresponding to the electric lock when the detection unit has detected an operation of the electric lock.

14. A device comprising:

a monitoring camera that is arranged at an entrance where an electric lock, which can read a unique ID of each key to be used, is installed;

a detection unit configured to detect an operation of the electric lock;

a control unit configured to associate the unique ID of a used key with image data captured by the monitoring camera when an operation of the electric lock has been detected;

a first acquisition unit configured to acquire face authentication data which is in advance associated with the unique ID read to the electric lock;

a first determination unit configured to determine a distinction between a face in image data associated with the unique ID by the control unit and a face indicated by the face authentication data associated with the unique ID; and a third storage unit configured to store image data, which is determined by the first determination unit as indicating a face different from the face authentication data, among the image data associated with the unique ID by the control unit.

15. The device according to claim 14, wherein the third storage unit is configured to store image data in association with a capturing date, wherein the device includes a first report unit configured to make a report to a security system corresponding to the electric lock based on a storage history of the image data of a same face among the image data stored by the third storage unit.

16. A device, comprising:

a monitoring camera that is arranged at an entrance where an electric lock, which can read a unique ID of each key to be used, is installed;

a detection unit configured to detect an operation of the electric lock;

a control unit configured to associate the unique ID of a used key with image data captured by the monitoring camera when an operation of the electric lock has been detected;

a first acquisition unit configured to acquire face authentication data which is in advance associated with the unique ID read to the electric lock;

a first determination unit configured to determine a distinction between a face in image data associated with the unique ID by the control unit and a face indicated by the face authentication data associated with the unique ID;

a fourth storage unit configured to store a history of entry and exit which is performed by each person having a face indicated by the face authentication data associated with the unique ID of each key;

at least one other monitoring camera that is arranged inside the entrance;

a specification unit configured to specify a key inside the entrance from the history of entry and exit in which each key is used;

a second determination unit configured to determine a distinction between a face in image data captured by the other monitoring camera and a face indicated by the face authentication data corresponding to the unique ID of a key specified as being inside the entrance; and a third report unit configured to make a report to a security system corresponding to the electric lock when the second determination unit has determined that a face in the image data and a face indicated by the face authentication data are different.

17. A method that is performed by a computer which includes a monitoring camera arranged at an entrance where an electric lock, which can read a unique ID of each key to be used, is installed, comprising:

detecting an operation of the electric lock; and controlling to associate the unique ID of a used key with image data captured by the monitoring camera when an operation of the electric lock has been detected;

acquiring face authentication data which is in advance associated with the unique ID read to the electric lock;

determining a distinction between a face in image data associated with the unique ID and a face indicated by the face authentication data associated with the unique ID; and transmitting the image data to a preset transmission destination when it is determined that a face in the image data associated with the unique ID is different from a face indicated by the face authentication data.

* * * * *